Patented Sept. 12, 1922.

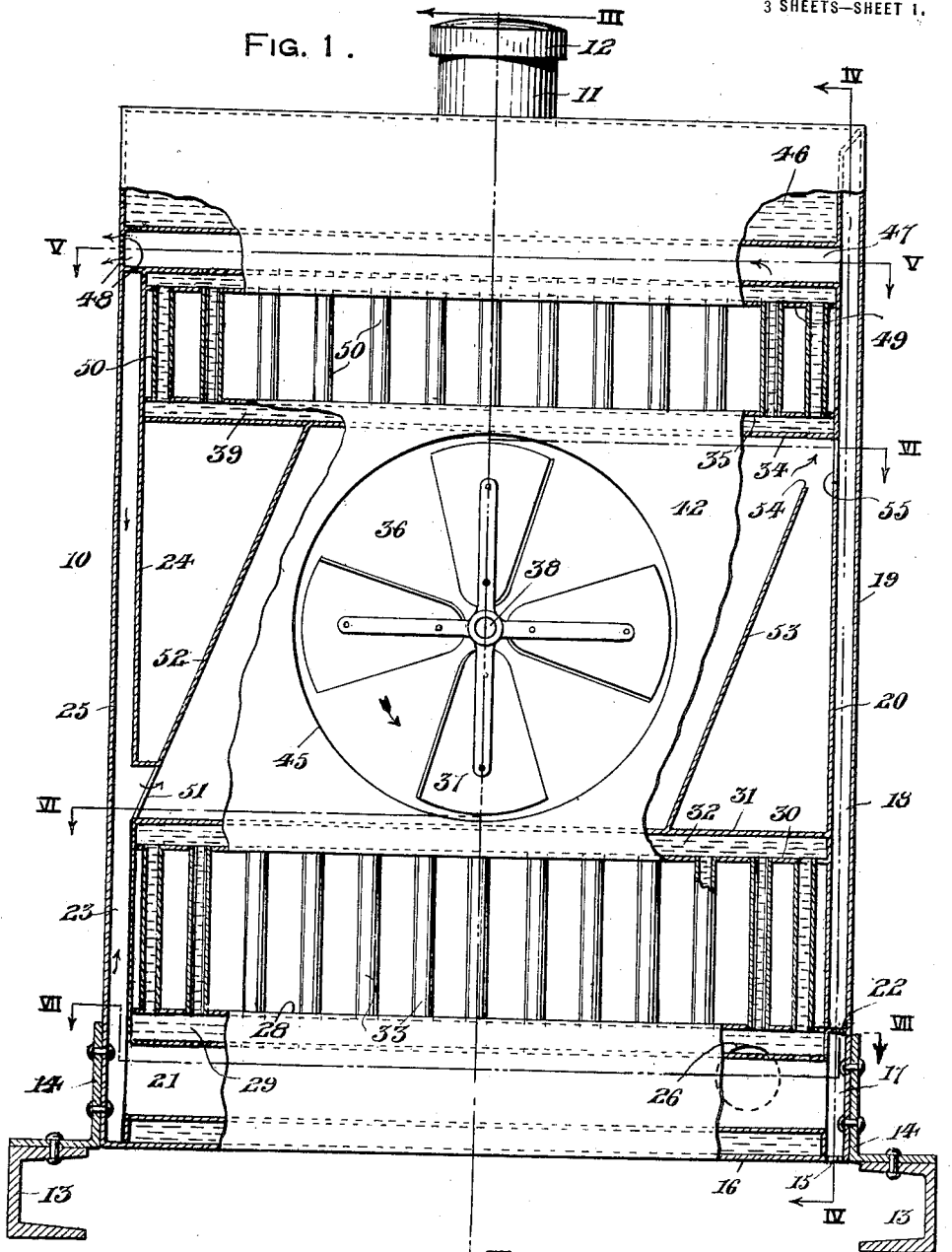

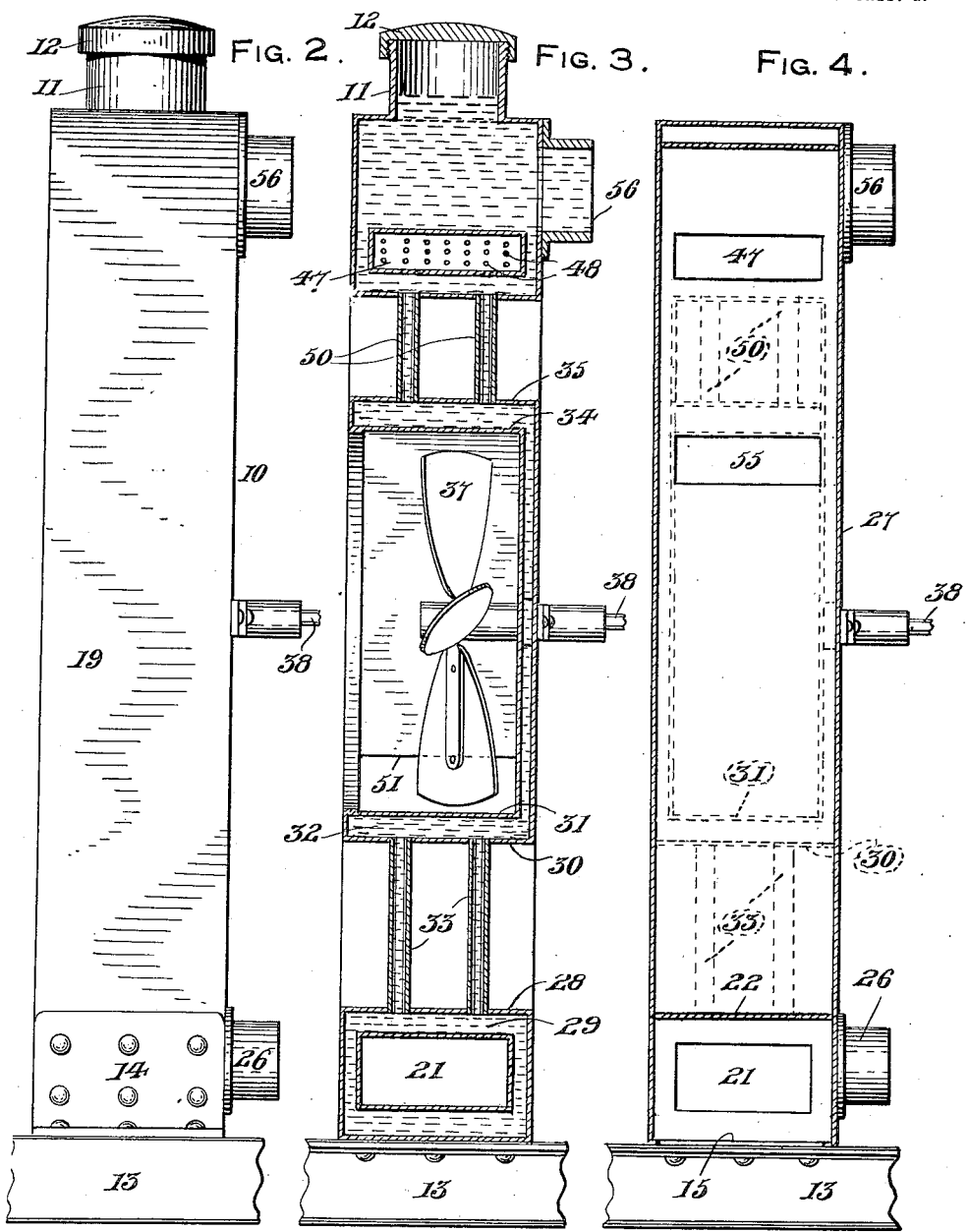

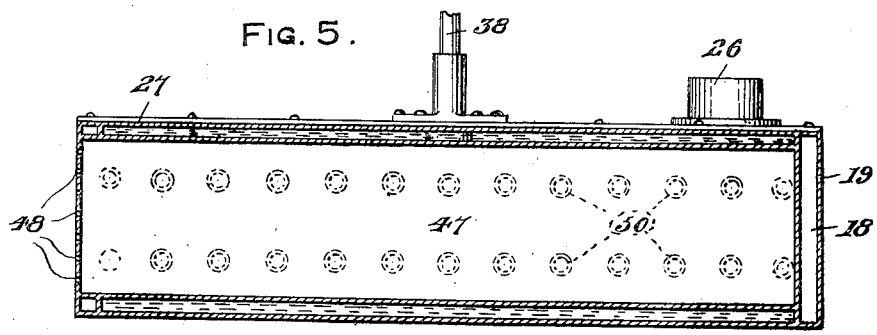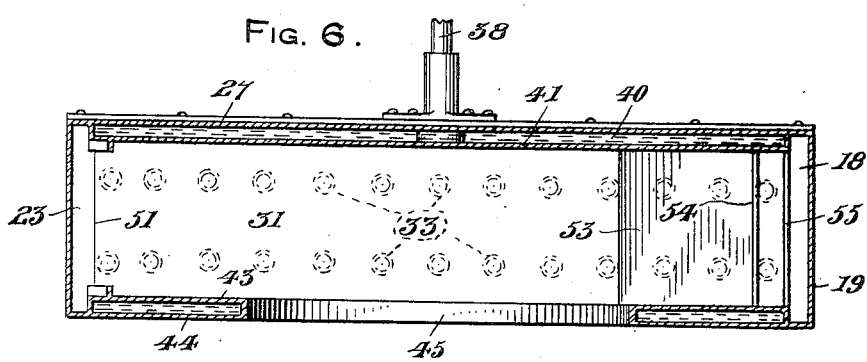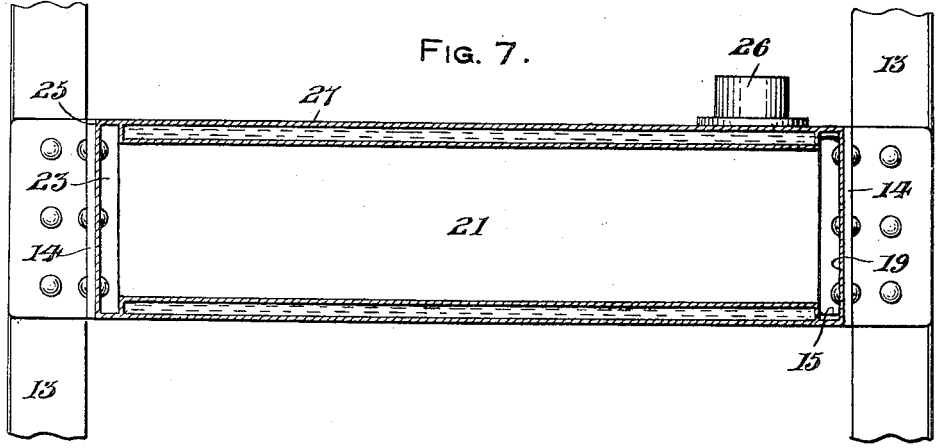

1,428,779

UNITED STATES PATENT OFFICE.

JOHN HAYDUSEK AND MATUS HUSARCIK, OF RACINE, WISCONSIN.

AUTOMOBILE RADIATOR.

Application filed May 16, 1919, Serial No. 297,472. Renewed June 20, 1921. Serial No. 479,084.

*To all whom it may concern:*

Be it known that we, JOHN HAYDUSEK and MATUS HUSARCIK, (1) a citizen of the United States of America, and (2) a citizen of Czecho-Slovakia (having declared his intention of becoming a citizen of the United States), residing at (both) Racine, in the county of Racine and State of Wisconsin, have invented certain new and useful Improvements in Automobile Radiators, of which the following is a specification.

The primary object of the invention is the provision of a radiator for the cooling system of an explosive motor such as that installed upon an automobile, designed for distributing and increasing radiation whereby cooling fluid is constantly provided for the motor.

A further object of the invention is the provision of an automobile radiator combining fluid cooling means therein, a positive air circulation hitherto being insured upwardly through the radiator for maintaining the fluid in the radiator constantly cool.

A still further object of the invention is the provision of a forced air draft through an automobile radiator in tortuous paths upwardly therethrough, cooling fluid in the radiator being divided and spread over a large area assisting the radiation for cooling purposes.

With these general objects in view the invention consists in the combination and arrangement of parts herein fully described in connection with the accompanying drawings and in which like reference characters designate corresponding parts throughout the several views.

In the drawings,

Figure 1 is a front elevational view of our invention partially broken away,

Figure 2 is a side view thereof,

Figures 3 and 4 are vertical sectional views of the same upon lines III—III and IV—IV respectively of Fig. 1, and Figures 5, 6 and 7 are horizontal transverse sectional views taken upon lines V—V, VI—VI, and VII—VII of Fig. 1.

Referring more in detail to the drawings, our radiator broadly comprises a rectangular casing 10 similar to the ordinary radiator of an automobile having a filling spout 11 at the top thereof provided with a closure cap 12 while the casing 10 is mounted upon the side rails 13 of the vehicle frame in any manner such as by means of the angle irons 14.

An air inlet 15 through the bottom 16 of the casing 10 communicates with the lower portion 17 of an air passage 18 at one side 19 of the casing 10, the said air passage being formed by an inner wall 20 slightly spaced from said side 19.

A tubular member 21 rectangular in cross section communicates with the lower portion of the air passage 18 below a partition 22 provided therein and extends across the casing 10 parallel with the bottom 16 thereof and communicates with an air passage 23 formed within the opposite side of the casing 10 by means of an inner wall 24 spaced from the opposite outer wall 25 of the casing. A water connection or sleeve 26 communicates through the inner side wall 27 of the casing 10 adjacent the tubular member 21 while a plate 28 between the walls 20 and 24 forms the top of a water chamber 29 in the lower portion of the casing 10 through which the tubular member 21 extends. Parallel partitions 30 and 31 between the inner walls 20 and 24 above the plate 28 provide a water chamber 32 therebetween communicating with the chamber 29 through a plurality of upright tubes 33 tapped through the plate 28 and partition 30.

Parallel walls 34 and 35 between the walls 20 and 24 considerably above the partition 31 provide a chamber 36, open at the front of the radiator with an air circulating fan 37 journaled therein by means of a shaft 38 extending rearwardly through the wall 27 of the casing 10. A water space 39 between the walls 34 and 35 communicates with the water chamber 32 by a water space 40 between the rear wall 27 of the casing and an inner wall 41 slightly spaced therefrom. The front side 42 of the casing between the partition 30 and wall 35 has an inner wall 43 spaced therefrom forming a water space 44 communicating with the water chambers 32 and 39 and with a circular opening 45 forwardly of the fan 37.

The filling spout 11 permits the filling of the radiator and communicates with the water chamber 46 in the upper portion thereof. Through the water chamber 46 an upper tubular member or air conduit 47 extends from the air passage 18 to the opposite outer wall 25 and is provided with outlet air perforations 48. A plate 49 beneath the tubular member 47 forms the bottom of the water chamber 46 and communicates with the water chamber 39 by means of tubes 50 capped through the plate 49 and partition 35.

The fan chamber 36 is between the double front and rear walls of the casing 10, the air passage 23 communicating with the fan chamber 36 by means of an inlet opening 51 through a partition 52 upwardly inclined toward the fan 37. A partition 53 parallel with and at the opposite side of the chamber 36 from the partition 52 extends from the partition 31 upwardly away from the fan 37 with its upper end 54 spaced from the partition 34 permitting the air from the fan 37 to pass between the partitions 53 and 34 and thence through an opening 55 in the wall 20 to the air passage 18. The air passes through said passage 18 from the opening 55 to the upper tubular member 47 passing through the rear and outwardly of the casing through the perforations 48. An upper hose connection or sleeve 56 communicates through the rear wall 27 of the casing 10 with the upper water chamber 46.

The operation of the invention will be apparent from this detailed description thereof, the casing 10 being mounted upon the rails 13 of the automobile frame, the sleeves 26 and 56 are connected to the usual hose connections of the water cooling system of the explosive motor while the radiator is filled with water through the usual filling spout 11. The fan 37 being operated by the motor through any desired connections draws air through the inlet 15, tubular member 21, air passage 23 and inlet opening 51 into the fan chamber 36 which assists in cooling the water in the lower water chamber 29.

The air from the inlet 51 as well as air from the opening 45 is forced by the fan 37, through the opening 55 into the air passage 18 and thence outwardly through the upper tubular member 47, whereby the water in the upper chamber 46 is cooled as well as the water in the adjacent jacketed portions of the casing 10 such as the front and rear walls thereof. The forward movement of the vehicle also assists in forcing air into the fan chamber 36 for circulating upwardly in the manner described but in the absence of the fan 37 causing the air to pass in an opposite direction through the lower portion of the casing 10, downwardly through the opening 51, through the air passage 23 and tubular member 21 and outwardly of the casing through the opening 15. The entire quantity of water employed in the cooling system of the motor repeatedly passes through the casing 10 by means of the water passages described and is constantly maintained in a cool condition by means of the fan 37 circulating the air through the air passages here described.

Having thus described our invention what we claim and desire to secure by Letters Patent is:—

1. A radiator structure comprising a casing having inner walls spaced from the opposite ends thereof forming upright air spaces, upper and lower tubular members communicating with the atmosphere at their relatively opposite ends with their other ends communicating with said air spaces at opposite sides of the casing, the casing having a substantially central fan chamber open at the front and closed at the rear of the radiator, upwardly inclined parallel partitions at opposite sides of the fan chamber, the said partitions and inner walls having openings communicating with said air passages whereby a passage of air is provided through the casing between the opposite ends of said tubular members.

2. A radiator structure comprising a casing having inner walls spaced from the opposite ends thereof forming upright air spaces, upper and lower tubular members communicating with the atmosphere at their relatively opposite ends with their other ends communicating with said air spaces at opposite sides of the casing, the casing having a substantially central fan chamber open at the front and closed at the rear of the radiator, upwardly inclined parallel partitions at opposite sides of the fan chamber, the said partitions and inner walls having openings communicating with said air passages whereby a passage for air is provided through the casing between the opposite ends of said tubular members, plates between said inner walls inwardly of said tubular members forming upper and lower water chambers, communicating water containing means above and below the fan chamber and tubes connecting said water chambers with said water containing means.

In testimony whereof we affix our signatures.

JOHN HAYDUSEK.
MATUS HUSARCIK.